United States Patent [19]
Harada

[11] Patent Number: 5,727,138
[45] Date of Patent: Mar. 10, 1998

[54] METHOD OF AND APPARATUS FOR GENERATING THREE-DIMENSIONAL MODEL

[75] Inventor: Hiroaki Harada, Kawasaki, Japan

[73] Assignee: Fujitsu Limited, Kawasaki, Japan

[21] Appl. No.: 451,735

[22] Filed: May 26, 1995

[30] Foreign Application Priority Data

Sep. 14, 1994 [JP] Japan .................................. 6-220382

[51] Int. Cl.⁶ .................................................. B06T 15/00
[52] U.S. Cl. ........................ 395/120; 395/119; 364/468.1
[58] Field of Search ................................ 395/120, 119, 395/141, 161; 364/468.03, 468.04, 468.09, 460.1

[56] References Cited

U.S. PATENT DOCUMENTS

| | | | |
|---|---|---|---|
| 5,448,696 | 9/1995 | Shimada et al. | 395/161 |
| 5,467,444 | 11/1995 | Kawamura et al. | 395/141 |

FOREIGN PATENT DOCUMENTS

| | | |
|---|---|---|
| 2-236782 | 9/1990 | Japan . |
| 3-331879 | 7/1993 | Japan . |
| 5-233764 | 9/1993 | Japan . |
| 4-79702 | 12/1993 | Japan . |

OTHER PUBLICATIONS

Meyer, Nancy Von, "The definition and principles of GIS", *Public Works*, v124, n2, p.43(2), renumbered pp. 1–5, Feb., 1993.

Wilson, John P., "Reinventing local government with GIS", *Public Works*, v126, n6, p.38(3),renumbered pp. 1–6, May, 1995.

Conry, Thomas; Hushon, Judith; Goldberg, Jane; Kneeling, Karl, "GIS comes to earth at Vandenberg Air Force Base", *Public Works*, v126, n4, p. 52(5), renumbered pp. 1–11, Apr., 1995.

Marshall, Patrick; Chiu, Peter; Tsang, Joanna; Mathews, Carla, "PC mapping software matures" *InfoWorld*, v14, n49, p.82(12), Dec. 7, 1992.

Functional Diagram Information System Workshop '93, Lecture Material, Oct. 28–29, 1993.

*Primary Examiner*—Phu K. Nguyen
*Assistant Examiner*—Rudolph Buchel
*Attorney, Agent, or Firm*—Staas & Halsey

[57] ABSTRACT

The present invention relates to a method for generating a three-dimensional model of a diagram based on a plane profile and coordinates of the diagram and an apparatus for implementing this method and is capable of generating a more realistic three-dimensional model than by the prior art. For implementing the method and the apparatus thereof, it is necessary to prepare in advance a parameter data base in which respective expected frequencies of appearance of a plurality of events which comprise undefined attributes, that is, those attributes, which are not included in the plane diagram information, of the attributes necessary for generation of a three-dimensional model.

7 Claims, 13 Drawing Sheets

| DATA ITEM | PRESENCE OF INPUT | RANGE OF ATTRIBUTES | FREQUENCY OF APPEARANCE |
|---|---|---|---|
| PLANE PROFILE DATA | YES | — | — |
| OWNER | YES | — | — |
| HEIGHT | YES | 1~99 STORIED | 1:2:3: · · · :99<br>1:1:2: · · · :0.1 |
| TYPE OF BUILDING | NO | BUILDING/ HOUSE/ SPECIAL STRUCTURE | BUILDING:HOUSE:SPECIAL STRUCTURE<br>2 : 3 : 1 |
| COLOR | NO | RED, BLUE, GREEN, YELLOW | RED:BLUE:GREEN:YELLOW<br>1 : 2 : 1 : 4 |
| MATERIAL | NO | CONCRETE/ WOOD | CONCRETE: WOOD<br>1 : 2 |
| SURFACE PATTERN | NO | DATA 1, DATA 2, · · · · | DATA 1: DATA 2: · · · ·<br>1 : 1 : · · · |

FIG.2

| BUILDING 1 | PLANE PROFILE DATA (LIMIT NUMBER n)<br>(X1,Y1),(X2,Y2),(X3,Y3),......,(Xn,Yn) |
|---|---|
| | ATTRIBUTES: COLOR = WHITE, OWNER = _____ CO.,LTD.<br>MATERIAL = UNKNOWN, NUMBER OF STOREYS = 3 |
| BUILDING 2 | PLANE PROFILE DATA (LIMIT NUMBER m)<br>(X1,Y1),(X2,Y2),(X3,Y3),......,(Xm,Ym) |
| | ATTRIBUTES: COLOR = RED, OWNER = MR. _____<br>MATERIAL = WOOD, NUMBER OF STOREYS = 2 |
| ---------- | ------------- |

FIG.3

| DATA ITEM | PRESENCE OF INPUT | RANGE OF ATTRIBUTES | FREQUENCY OF APPEARANCE |
|---|---|---|---|
| PLANE PROFILE DATA | YES | — | — |
| OWNER | YES | — | — |
| HEIGHT | YES | 1~99 STORIED | 1:2:3: · · · :99<br>1:1:2: · · · :0.1 |
| TYPE OF BUILDING | NO | BUILDING/ HOUSE/ SPECIAL STRUCTURE | BUILDING:HOUSE: SPECIAL STRUCTURE<br>2 : 3 : 1 |
| COLOR | NO | RED, BLUE, GREEN, YELLOW | RED:BLUE:GREEN:YELLOW<br>1 : 2 : 1 : 4 |
| MATERIAL | NO | CONCRETE/ WOOD | CONCRETE: WOOD<br>1 : 2 |
| SURFACE PATTERN | NO | DATA 1, DATA 2, · · · · · | DATA 1: DATA 2: · · · ·<br>1 : 1 : · · · |

FIG.4

| BUILDING 1 | | |
|---|---|---|
| PLANE PROFILE DATA | YES | (X1,Y1), . . . . . . . . , (Xn,Yn) |
| OWNER | YES | ○○ CO., LTD. |
| HEIGHT | YES | 3-STORIED |
| TYPE OF BUILDING | NO | BUILDING: HOUSE = 1 : 2 |
| COLOR | YES | WHITE |
| MATERIAL | NO | CONCRETE: WOOD = 1 : 2 |
| SURFACE PATTERN | NO | DATA 1 : DATA 2 = 1 : 1 |

FIG.5

| BUILDING 1 | | |
|---|---|---|
| PLANE PROFILE DATA | YES | (X1,Y1,H), . . . . . . . . , (Xn,Yn,H) |
| OWNER | YES | ○○ CO., LTD. |
| HEIGHT | YES | 3-STORIED |
| TYPE OF BUILDING | YES | HOUSE |
| COLOR | YES | WHITE |
| MATERIAL | YES | CONCRETE |
| SURFACE PATTERN | YES | DATA 2 |

FIG.8

| | WHOLE/PART | | | | | | |
|---|---|---|---|---|---|---|---|
| SAMPLE BUILDING 1 | PROFILE OF THE ROOF IN CASE OF "PART" (LIMIT NUMBER R): (X1,Y1,Z1),......,(XR,YR,ZR). | PROFILE OF THE FIRST FLOOR IN CASE OF "PART" (LIMIT NUMBER L): (X1,Y1,Z1),......,(XL,YL,ZL). | PROFILE IN CASE OF "WHOLE" (LIMIT NUMBER n): (X1,Y1,Z1),......,(Xn,Yn,Zn). | ATTRIBUTES: COLOR = WHITE, TYPE = BUILDING MATERIAL = CONCRETE, NUMBER OF STOREYS = (UNDETERMINED) SURFACE PATTERN = DATA 1 | ------- | ------- | ------- |
| SAMPLE BUILDING 2 | ------- | | | | | | |

METHOD OF AND APPARATUS FOR GENERATING THREE-DIMENSIONAL MODEL

BACKGROUND OF THE INVENTION

The present invention relates to a method for generating a three-dimensional model based on a plane profile of a diagram and coordinates thereof and an apparatus for use in embodiments of the method. More particularly, the present invention relates to a method of and an apparatus for building up, for example, a three-dimensional spectacle delineation model of a city from a map information on a two-dimensional plane.

An applications of computer graphics, simulations of buildings on computer displays by way of spectacle delineation views of cities are becoming popular as an aspect of computer games and information services. Users of computers are able to perform an exchange of information in the same sense as in real cities by displaying realistic urban spectacles on computer terminals. It is therefore expected that information exchange by way of computers can be greatly developed and promoted.

On the other hand, a huge volume of three-dimensional geometrical data must be entered in a computer system to present such urban spectacle delineation in a realistic mode. In addition, the actualities of such presentation have been such that efforts for generating the urban spectacle greatly exceed the value derived from provision of such spectacle delineation information. Thus, utilization of computer displays of the spectacles has been impeded.

To solve this problem, it has been proposed to form a pseudo-realistic urban spectacle delineation based on two-dimensional map information instead of directly entering three-dimensional information (see, for example, "Three-dimensional Delineation of Map and Facility Data and Data Control" Yasuaki Nakamura, Central Research Institute of Mitsubishi Electric Corporation, the lecture material at Functional Diagram Information System Workshop '93 sponsored by image Graphics Research Expert Committee, cosponsored by Japan Society of Geographical Information System, May 28 to 29, 1993).

This proposal is intended to build up a three-dimensional pseudo-realistic spectacle delineation by extending a plane diagram in a direction of height based on the two-dimensional map information.

Conventional methods for forming the three-dimensional pseudo-realistic spectacle delineation have defects as described below.

(1) Generally, conventional methods can only generate the data of a columnar building having bottom and top views in the same shape which can be automatically generated, and can therefore present only simple buildings. Though the above reference describes that office buildings and general household buildings are classified, it is unknown how a three-dimensional spectacle delineation of general household buildings is generated from a plane diagram classified for general household buildings. In addition, the conventional methods have been unavailable for presentation of those buildings with special profiles (temples, abbeys, historical buildings and the like).

(2) An urban residence map which is supplied in advance basically includes only geographical data of a plane diagram. Accordingly, in most cases, height information and color information are generated by using random numbers as required and the variations of the values obtained are not taken into consideration. For example, in the case that a brownish color is prominent in some towns, and other colors are prominent in other towns, a frequency of occurrence of random numbers should be changed. However, the conventional methods have not provide appropriate means.

(3) If names of owners are recorded as information supplied from an urban residence map, even household buildings owned under such personal names have been indiscriminately classified into "buildings" and therefore the correspondence between the contents of the urban residence map and the profiles of buildings could have not been ensured. Accordingly, the conventional method is disadvantageous in that a produce image is far different from an actual urban spectacle delineation.

SUMMARY OF THE INVENTION

An object of the present invention, made in view of the above problem, is to provide a three-dimensional model generating method capable of generating a three-dimensional model (for example, a pseudo-realistic three-dimensional spectacle delineation model of a city) which is closer to an actual city than that formed by the conventional method of building up a three-dimensional model from plane diagram information, and to provide an apparatus for use in embodiments of the method described above.

A three-dimensional model generating method according to the present invention which is intended to attain the above-described object is characterized to generate three-dimensional profile information which presents a three-dimensional model which has a profile corresponding to plane diagram information by preparing in advance a plane diagram data base, which includes plane profile information for presenting plane profiles of diagrams and plane diagram information which is allowed to include a defined attribute having a defined event, which is part of a plurality of attributes each comprising a plurality of events for generating a three-dimensional model of the diagrams thereof, and is stored with respect to a plurality of diagrams, and a parameter data base for which respective expected frequencies of appearance of a plurality of events which respectively comprise the attributes are defined with respect to at least undefined attributes except the defined attribute of the plurality of attributes, reading the plane diagram information from the above plane diagram data base, selecting one event of undefined attributes in accordance with the expected frequency of appearance of a plurality of events of the undefined attributes, which are defined in the parameter data base, while referring to the above parameter data base, and adding the selected event to the plane diagram information read from the above plane diagram data base.

A three-dimensional model generating apparatus according to the present invention intended to attain the above-described object is characterized to comprise:

(1) reading means for reading the plane diagram information from the plane diagram data base, which includes plane profile information for presenting plane profiles of diagrams and plane diagram information which is allowed to include a defined attribute having a defined event, which is part of a plurality of attributes each comprising a plurality of events for generating a three-dimensional model of the diagrams thereof, and is stored with respect to a plurality of diagrams;

(2) a first memory for storing the parameter data base for which a frequency of expected appearance of a plurality of events which respectively comprise the attributes is defined;

(3) three-dimensional profile generating means for selecting one event of undefined attributes in accordance with the expected frequency of appearance of a plurality of events of the undefined attributes, which are defined in the parameter data base, while referring to the above parameter data base, and adding the selected event to the plane diagram information read from the above plane diagram data base;

(4) a second memory for storing three-dimensional profile information with respect to a plurality of diagrams; and (5) writing means for writing the three-dimensional profile information generated by the above three-dimensional profile generating means in the above second memory.

In this case, for selecting an event of the undefined attribute to be added to the plane diagram information read by the above-described reading means, the three-dimensional profile generating means selects an event with a lower frequency of actual appearance than the above-described expected frequency of appearance from a plurality of events of the undefined attributes on the basis of the expected frequency of appearance defined in the above parameter data base of a plurality of events of the undefined attributes and the actual frequencies of appearance of the events of the undefined attributes which are added to the plane diagram information read in the past by the reading means, and selects one event from events with the low frequency of appearance according to the random numbers.

In the three-dimensional model generating apparatus according to the present invention, it is preferable that a third memory, which stores the sample data base in which a plurality of three-dimensional profile samples presenting a three-dimensional profile of a diagram are defined, is provided, the three-dimensional profile generating means selects the event of the undefined attributes while referring to the parameter data base and a three-dimensional profile sample conforming to the selected event of the plane diagram information and the undefined attribute which are read by the reading means, and the three-dimensional profile information is generated by adjusting the three-dimensional profile samples.

In this case, it is preferable that the third memory stores the sample data base in which the three-dimensional profile samples presenting a three-dimensional profile for which repetition of those repetitive portions of the three-dimensional profile samples presenting the whole three-dimensional profile of the diagram and the three-dimensional profile of the diagram is omitted and, when the three-dimensional profile samples for which repetition is omitted are selected, the three-dimensional profile generating means generates the three-dimensional profile samples which present the whole three-dimensional profile of the diagram by repeating the above repetitive portions and the three-dimensional profile information by adjusting the three-dimensional profile samples. For selecting the three-dimensional profile samples, referring to the sample data base, it is preferable that the above-described three-dimensional profile generating means sets an conformity which denotes an extent of conformity of the plane diagram information, which is read by the reading means, and the undefined attributes to the selected event, retrieves the three-dimensional profile samples which satisfy the conformity, and selects the three-dimensional profile samples by setting again the conformity, which is lowered when the corresponding three-dimensional profile samples are not retrieved, and repeating the process of re-retrieval.

In the three-dimensional model generating apparatus according to the present invention, it is preferable that a fourth memory for storing a knowledge data base for inferring the event of the undefined attributes based on the plane diagram information is provided and the three-dimensional profile generating means selects the inferred event as the event of the undefined attributes, referring to the knowledge data base, when the event of the undefined attributes is inferred according to the knowledge data base.

The three-dimensional model generating method and the apparatus thereof according to the present invention are capable of generating a more realistic model by defining the expected frequency of appearance of the events of undefined attributes in the parameter data base along a three-dimensional model to be formed, for example, an image of an urban spectacle model since the parameter data base is prepared for which the expected frequency of appearance is respectively defined for a plurality of events, which comprise undefined attributes, that is, those attributes, which are not included in the plane diagram information, of the attributes necessary for generating the three-dimensional model.

As described above, according to the present invention, a three-dimensional model suited to the purpose can be easily generated only by changing the frequency of appearance of the event of the undefined attributes which is defined as the data base, and high freedom and versatility are ensured. When the plane diagram information includes in advance the defined attribute of the event (defined attribute: for example, an event of "five-storied" in an attribute of "height of building"), the defined attribute is used as is and an optimum model in response to a degree of minuteness of the contents of the original plane diagram information is generated by automatically generating the event only with respect to the undefined attributes.

As described above, though a more realistic model than in the conventional simple model generation by uniform distribution can be generated by defining in advance the expected frequency of appearance of the events of undefined attributes such as, for example, the color, material and wall pattern of a building, a mode occurs where the event is selected at a rate substantially different from the expected frequency of appearance even though the probability is lower when the event is selected with the expected frequency of appearance is regarded as a probability distribution function. On the other hand, the expected frequency of appearance is a reflection of a will of the operator who wishes to make the event appear at the frequency and accordingly it is not preferable that the actual frequency of appearance is largely different from the expected frequency of appearance. Though the present invention does not deny selection of the event by regarding the expected frequency as the probability distribution function, the three-dimensional profile generating means selects the event with a lower actual frequency of appearance than the expected frequency of appearance from a plurality of events of undefined attributes in accordance with the expected frequency of appearance defined in the parameter data base of the plurality of events of undefined attributes and the actual frequency of appearance of respective events of the undefined attributes added to the plane diagram information read by the reading means in the past in selection of the event of undefined attributes to be added to the plane diagram information read in this case by the reading means, and in a case that one of events with the low frequency of appearance is selected according to the random numbers, the actual frequency of the finally selected event is always the same as or approximate to the expected frequency of appearance.

In a three-dimensional model generating apparatus according to the present invention, if a third memory which stores the above-described sample data base is provided, a conforming three-dimensional profile sample is selected from the sample data base and three-dimensional profile information is generated by adjusting the selected three-dimensional sample, not only a columnar building but also those objects of diversified profiles, which are generated in advance as samples, can be automatically arranged in accordance with the plane diagram. Accordingly, specific structures such as, for example, a temple, church and castle can be added to the spectacle as well as general houses.

Since the three-dimensional profile samples are defined as the data base, the versions of the data base can be easily graded up to allow generation of a more realistic three-dimensional profile model by adding the three-dimensional profile samples to the data base.

For defining this three-dimensional profile sample and storing it in the sample data base, for example, all stories of a building have the same appearance to be repeated in graphical delineation. In this case, if a three-dimensional profile sample which presents a three-dimensional profile for which repetition of the portions thereof to be repeated is omitted is defined in advance and the delineation of those repetitive portions is repeated in generation of the three-dimensional model, the capacity for the sample data base can be small.

For selecting a specific three-dimensional profile sample from a number of three-dimensional profile samples, which are stored in the sample data base, referring to this sample data base, the three-dimensional model generating apparatus is adapted so that an conformity which denotes an extent of conforming to the plane diagram information read by the reading means and the selected event of undefined attributes, a three-dimensional profile sample which satisfies the conformity is retrieved and, if a corresponding three-dimensional profile sample is not retrieved, the three-dimensional sample is selected by setting again the conformity the extent of which is reduced and repeating the retrieving process, a three-dimensional profile sample which best conforms to the plane diagram information can be selected and a more realistic three-dimensional profile model an be generated.

In addition, if the three-dimensional model generating apparatus according to the present invention is adapted to have a fourth memory which stores the knowledge data base for inferring the events of undefined attributes according to the plane diagram information and infer the events of undefined attributes according to the knowledge data base, for example, the event of "building" is assigned to a tall building owned by a corporation and the event of "temple" is assigned to a building having a large plane area owned by a religious organization or corporation with respect to the attribute of "type of building" and thus a more realistic profile model can be generated.

As described above, the present invention generates a more realistic three-dimensional profile model than the prior art.

BRIEF DESCRIPTION OF THE DRAWINGS

FIG. 2 is a diagram showing an example of the urban residence map;

FIG. 3 is a diagram showing an example of the parameter data base;

FIG. 4 is a diagram showing an example of the data table which is generated in the determination part and sent to the selection part;

FIG. 5 is a diagram showing an example of the data table in which the events defined by the selection part are recorded;

FIG. 8 is a diagram showing an example of the sample data base;

FIG. 11 is a diagram showing the algorithm for determining whether the plane profiles are similar;

DETAILED DESCRIPTION OF THE INVENTION

The embodiments of the present invention are described below in detail, referring to the accompanying drawings.

Figure 1:
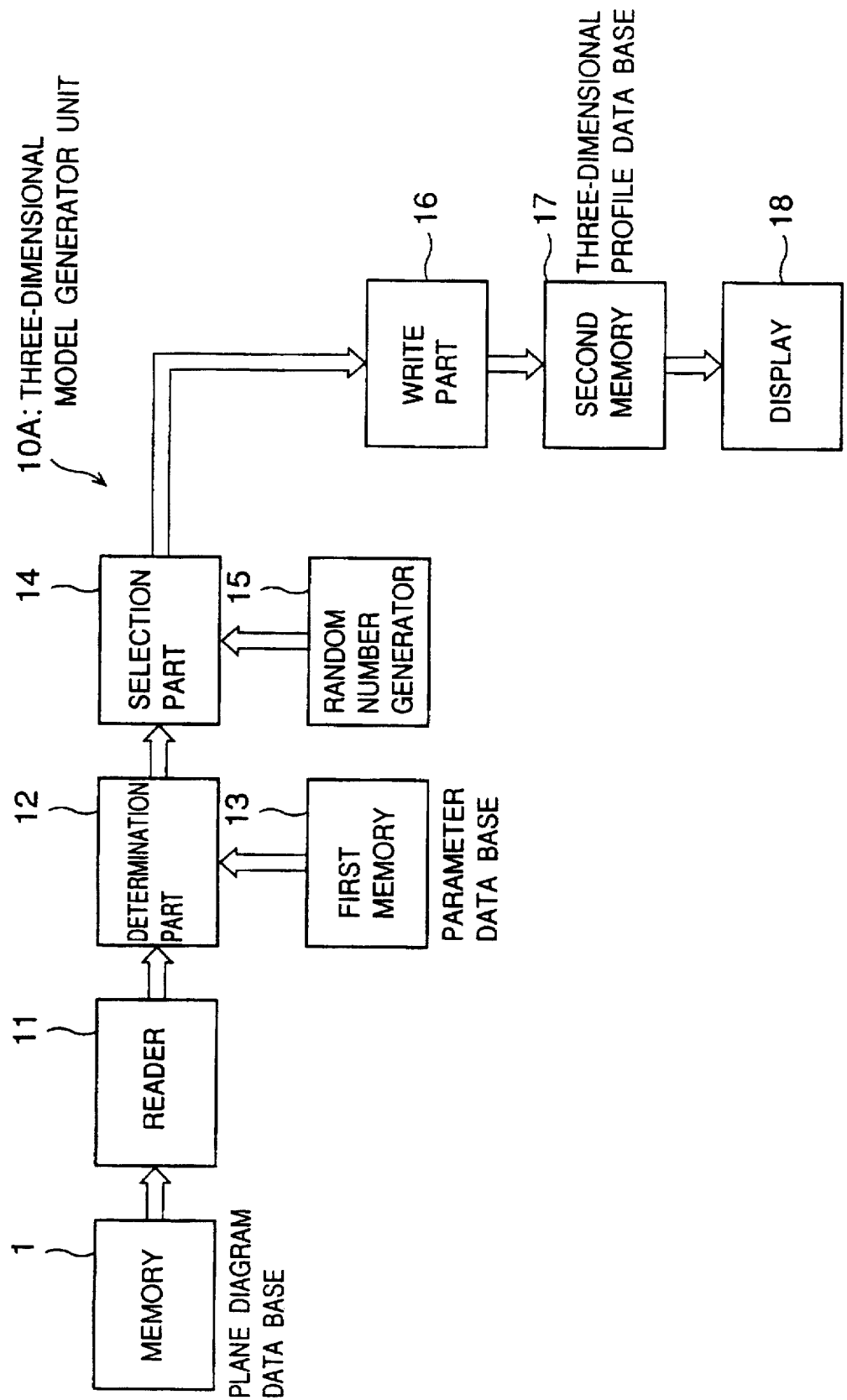
FIG. 1 is a block diagram showing the first embodiment of the three-dimensional model generating apparatus according to the present invention.

With reference to FIG. 1, memory 1 is an external memory such as, for example, a floppy disc and an optical disc which can be reloaded. This first memory 1 stores a plane diagram data base including an urban residence map (an assemblage of plane diagram information for the purpose of the present invention).

This urban residence map basically includes plane diagram data such as roads and houses as viewed from the sky and may also include attribute data belonging to respective buildings. This kind of urban residence map is stored in the external memory 1, and some types of the map are commercially sold.

FIG. 2 is a diagram showing an example of the urban residence map. Plane profile data and attributes of a number of buildings such as, for example, building 1, building 2, . . . are recorded in urban residence map. The plane profile data denotes the plane profiles of respective buildings and the attributes are the data belonging to these buildings. In this example, the color, owner, material and number of stories of the building are shown as the attributes.

The reading part 11, which forms the three-dimensional model generating apparatus 10A shown in FIG. 1, corresponds to an example of reading means in the present invention and is provided with a memory 1 from which the plane diagram data of respective buildings are read out in sequence or totally. The plane diagram data read out from the reading part 11 is entered into the determination part 12.

The three-dimensional model generating apparatus 10A is provided with a first memory 13 which stores a parameter data base.

FIG. 3 shows an example of the parameter data base. This parameter data base is prepares a model (to be generated by an operator who tries to form an urban three-dimensional model) in view of the minuteness of the urban residence map and the image of the whole city (which are stored in the memory 1) before generation of the three-dimensional urban model.

"Data item" denotes the attributes of buildings, and "presence of input", "range of attributes" and "frequency of appearance" are recorded as required with respect to each data item. "Presence of input" indicates whether the data item is the data item which should be entered from the plane diagram data base stored in the memory 1. "value area" indicates a range of value (attribute) to be taken by the data item, and "frequency of appearance" indicates an expected frequency of appearance of respective values in the value area. In this example, though "presence of input" with respect to, for example, the data item "height", the "value area" and the "frequency of appearance" are also defined. In this case, though it is determined that the plane diagram data read from the memory 1 by the reading part 11 includes the information of height, the value area and the frequency of appearance in the parameter data base shown in FIG. 3 are referred and the height information is generated as described later when the height information is not included in the plane diagram data which has been actually read. This is the same even in the case that "presence of input" is identified as "NO" and it is determined that the information of the data item is not included in the plane diagram data read from the memory 1. However, if the information of the data item is included in the plane diagram data actually read from the memory 1, the information recorded in the value area and the frequency of appearance in the parameter data base shown in FIG. 3 is ignored. In other words, the information of "presence of input" in the parameter data base only has a role of a memorandum or the like to be used by the operator to generate the parameter data base.

In the determination part 12 shown in FIG. 1, a data table in which the data of the parameter data base is applied to an insufficient portion of the plane diagram data sent from the reading part 11 while referring to the parameter data base stored in the first memory 13, and the data table generated is entered into the selection part 14.

FIG. 4 shows an example of a data table which is generated in the determination part 12 and sent to the selection part 14. FIG. 4 shows the data table regarding a certain building 1 and the data in the column "YES" in this table is transferred from the plane diagram data sent from the reading part 11, and the data in the column "NO" is transferred from the parameter data base stored in the first memory 13 since it is not recorded in the plane diagram data sent from the reading part 11. This data table includes a column in which the expected frequency of appearance of the undefined event is recorded as, for example, the column for the type of building "building:house=1:2" transferred from the parameter data base.

FIG. 5 shows an example of a data table in which the events defined by the selection part 14 are stored. The selection part 14 selects an event in the column in which the expected frequency of appearance according to a random number generated by the random number generator 15, referring to the data table as shown in FIG. 4 entered in the selection part 14, and the data table as shown in FIG. 5 is generated.

Figure 6:
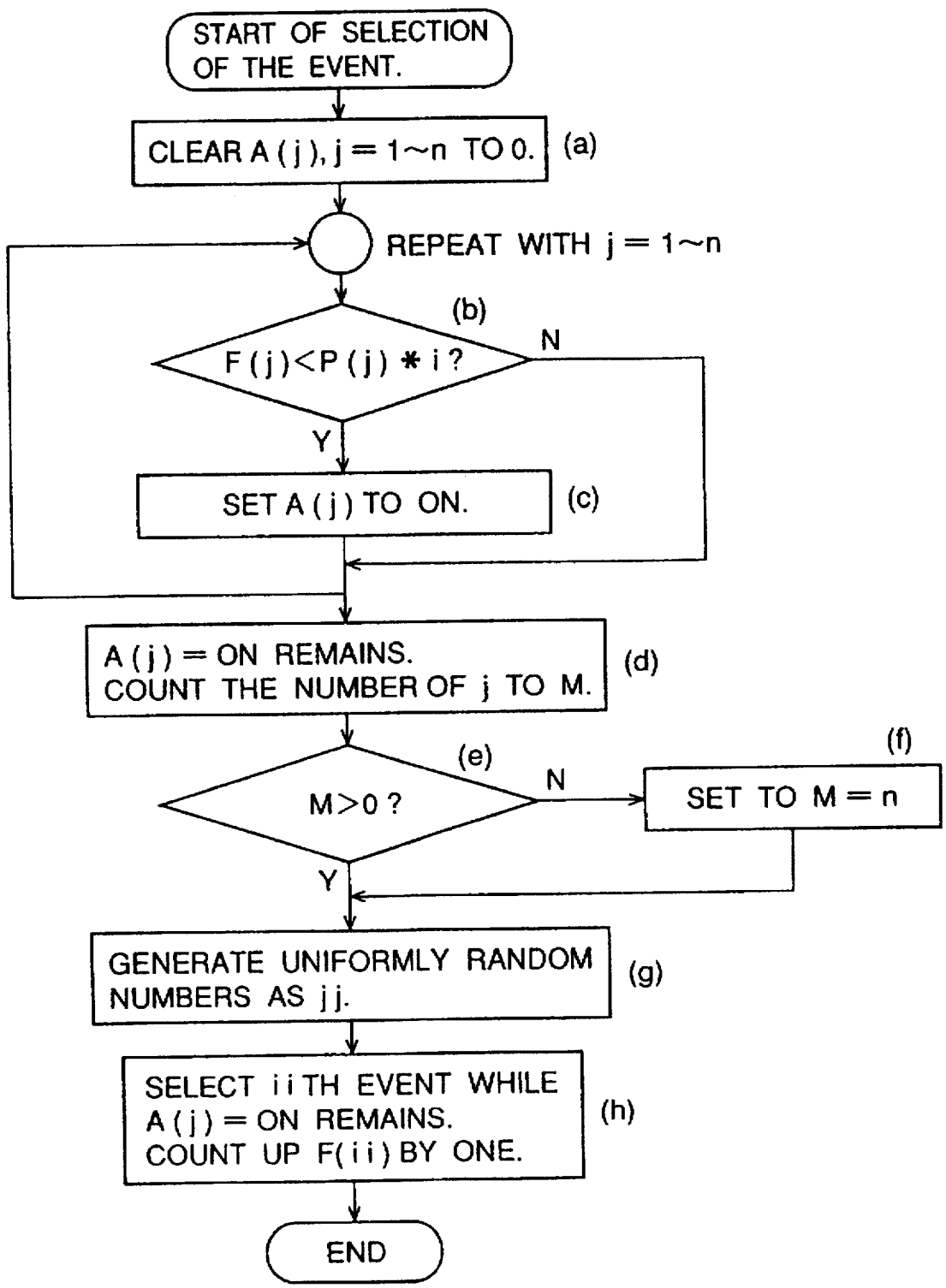
FIG. 6 is a flow chart showing an example of means for selecting the events according to the expected frequency of appearance in the selection part.

FIG. 6 is a flow chart showing an example of a method for selecting the event according to the expected frequency of appearance by the selection part 14. When an event of one undefined attribute (each of the type, material and surface pattern of the building in FIG. 4) in the data table as shown in FIG. 4 is to be selected, the flow shown in FIG. 6 is executed once for each attribute.

In step a, all work flags A (j), j=1~n are cleared. In this case, n denotes the number of events of undefined attributes and, in case of FIG. 4, n=2 is given for any of the type, material and surface pattern of the building.

In step b, whether or not the following is satisfied is determined.

$$F(j) < P(j) * i \qquad (1)$$

In this equation (1), i denotes the number of buildings for which a three-dimensional model generation processing of these buildings has been finished of a number of buildings which form the urban three-dimensional model being generated. j denotes the j-th attribute of the attribute (for example, the type of building) to be currently selected, and P (j) denotes a value obtained by normalizing the expected frequency of appearance of the j-th event so that a total of expected frequencies of appearance of all events which form the attribute is 1.0. F (j) denotes a cumulative number obtained by counting up the number of the attributes for which the j-th event is selected from the beginning of generation of the urban three-dimensional model being currently generated.

In other words, according to the above equation (1), whether or not the actual frequency of appearance F (j of the event j is lower than the expected frequency of appearance P (j)*i, that is, whether or not the event ms an event with a low frequency of appearance is determined in step c, the flag A (j) which indicates that the event j is an event with a low frequency of appearance is set to ON. The above steps b and c are repeated for all events j=1~n and consequently a map which presents an event with a low frequency of appearance is generated in a map {A (j), J=1~n}.

In step d, the map {(A (j), J=1~n} which presents the event with the low frequency of appearance is reference and the number of flags A (j) which are ON are counted as "M".

In step e, M>0 or not is determined and, if M=0, the number of the flags is initialized to M=n (the number of events with the attribute) (step f).

In step g, one integer is generated according to the uniformly random numbers from integers in a range of 1~M by using the random number generator 15 shown in FIG. 1. This generated integer is assumed as In step h, flags A (j) are searched and an event X (ii) corresponding to the jj-th flag A (j) of those flags which are ON is selected. In step h, the cumulative value F (ii) corresponding to the selected event is counted up by one.

As described above, one of events with the low frequency of appearance at respective timings is selected. Accordingly, the actual frequencies of appearance of respective events when the three-dimensional models for all buildings are generated are approximate to the expected frequency of appearance entered in advance.

Thus, in the selection part 14, the data table (see FIG. 5) in which the events of all attributes are defined is generated. This data table presents a three-dimensional profile model of the building. In this embodiment, combination of the determination part 12, the selection part 14 and the random number generator 15 is deemed as an example of three-dimensional profile generating means according to the present invention.

The data table generated in the selection part 14 is sent to the writing part 16 whereby the data table sent is stored in the second memory 17. Thus, the three-dimensional profile models of respective buildings are stored in the second memory 17 whereby a three-dimensional profile data base which presents a three-dimensional model of the city is generated in this second memory 17.

The three-dimensional data base formed in the second memory 17 is read out from the second memory 17 into the display 18 and the three-dimensional urban model is drawn on the display screen, not shown, of the display 18.

Figure 7:
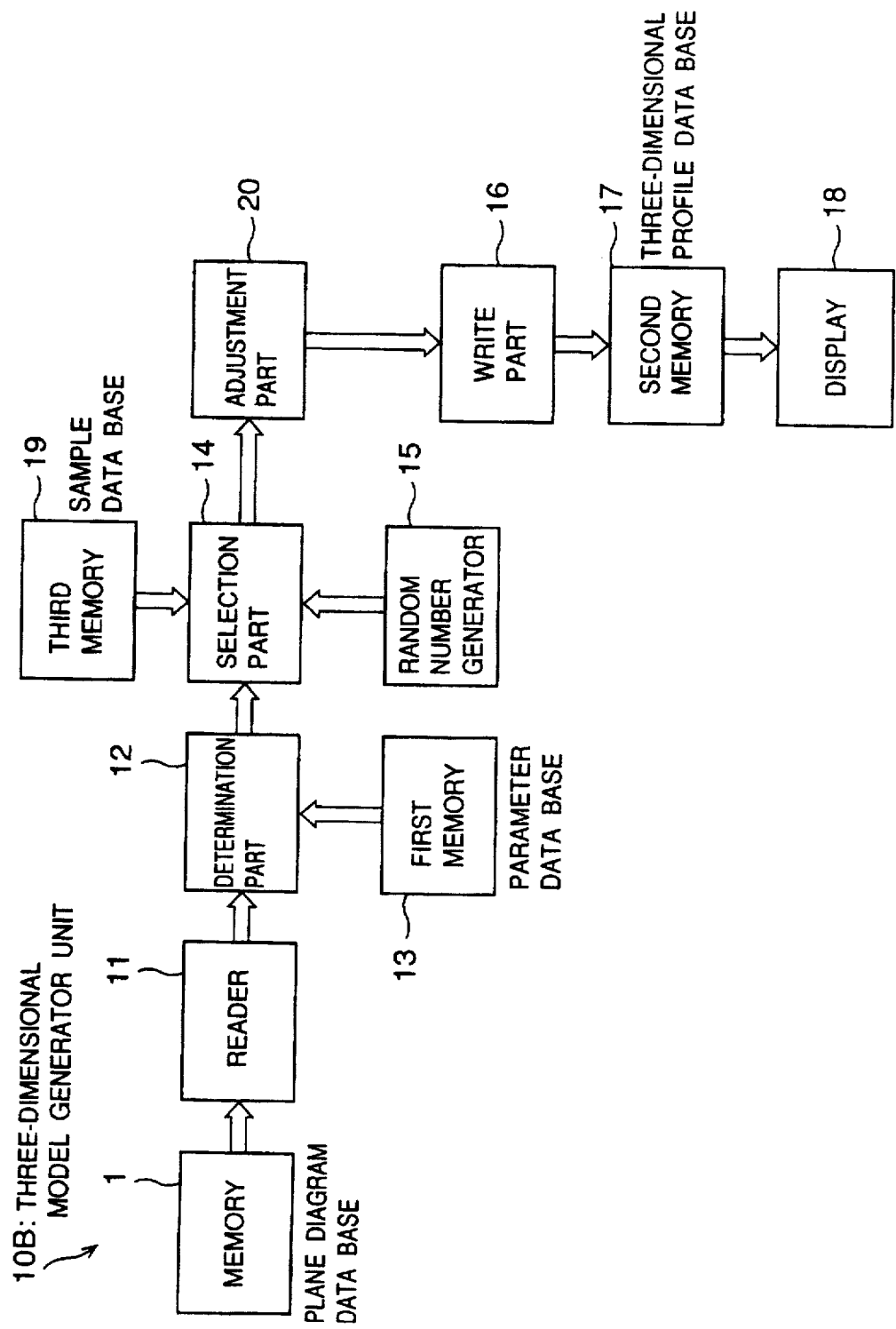
FIG. 7 is a block diagram showing the second embodiment of the three-dimensional model generating apparatus according to the present invention.

FIG. 7 is a block diagram of the second embodiment of the three-dimensional model generating apparatus according to the present invention. Those blocks corresponding to respective blocks of the first embodiment shown in FIG. 1 are shown with the same numbers as in FIG. 1 and only different points are described.

In the second embodiment shown in FIG. 7, a third memory 19 in which a sample data base described below is stored and an adjustment part 20 are provided as compared with the first embodiment shown in FIG. 1.

Figure 9:
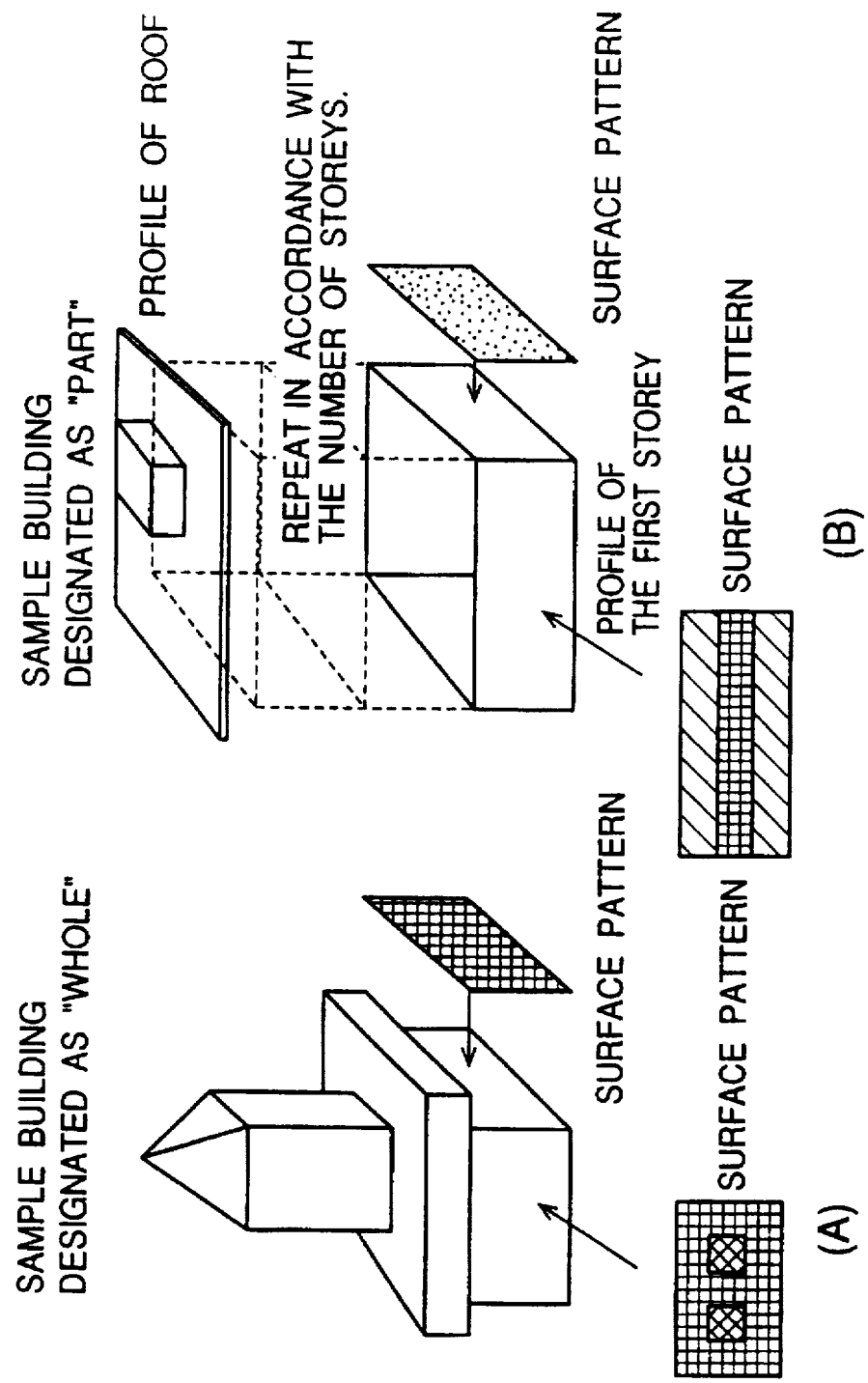
FIG. 9 is a concept diagram of the sample data.

FIG. 8 shows an example of the sample data base and FIG. 9 is a concept diagram of the sample data base.

A number of three-dimensional profile samples are stored in the sample data base in a mode, for example, shown in FIG. 8. The three-dimensional profile samples stored in this sample data base include a three-dimensional profile sample which presents the whole sample building as shown in FIG. 9(a) and a three-dimensional profile sample in which repetition of portions to be repeated of the sample building is omitted as shown in FIG. 9(b). In a case of a building structure as shown in FIG. (b), only the shapes of the first floor part and the roof are stored. For forming an actual three-dimensional profile model from this sample, the first floor profile sample is stacked one on another as many as the required number of stories of the building.

The three-dimensional profile sample thus stacked or the three-dimensional profile sample presenting the whole sample building which is read from the sample data base is adjusted to conform to the plane diagram data as described later.

Figure 10:
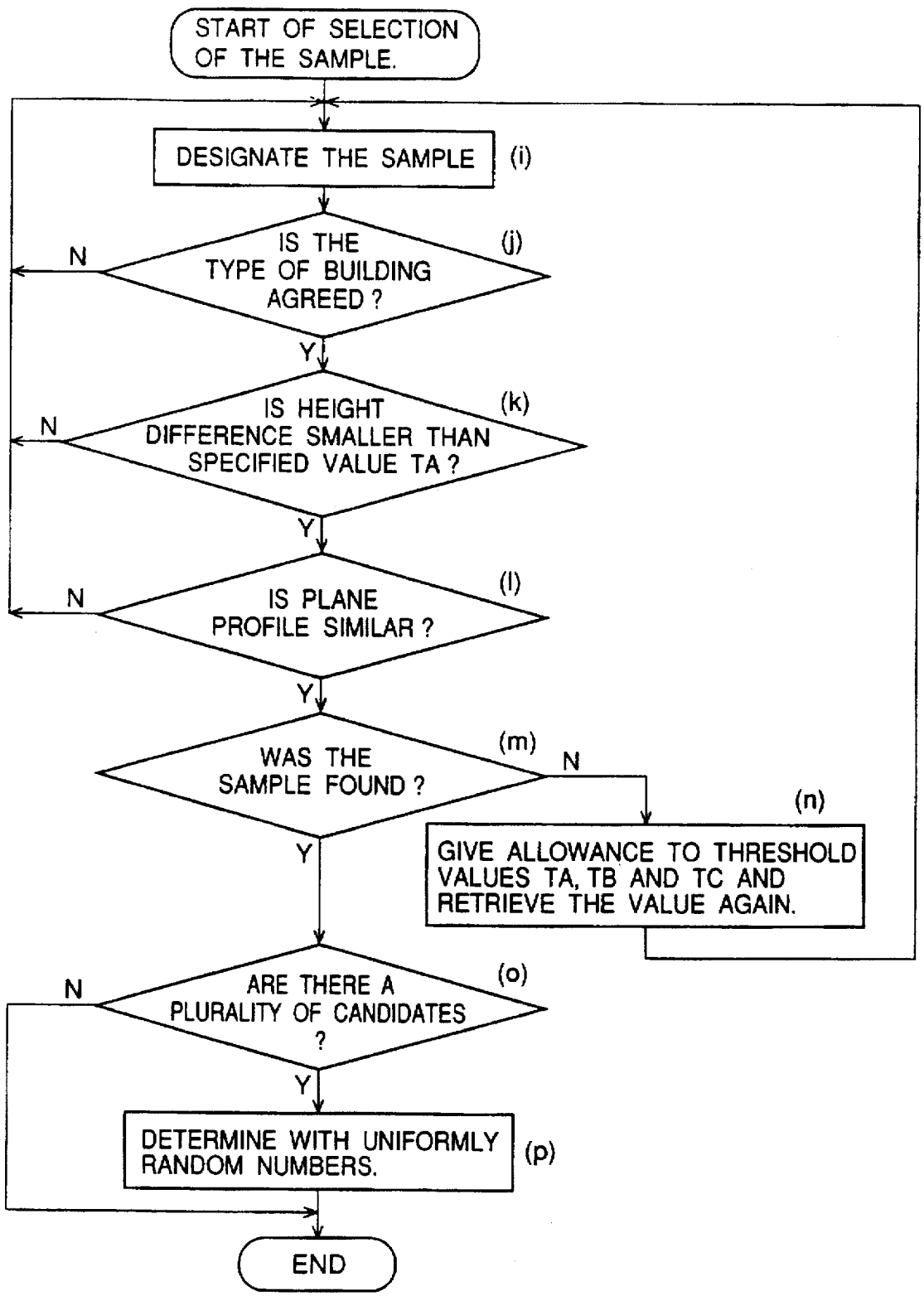
FIG. 10 is a flow chart showing the algorithm for selecting one three-dimensional profile sample from a number of three-dimensional profile samples stored in the sample data base.

FIG. 10 is a flow chart showing an algorithm for selecting one conforming three-dimensional profile sample from a number of three-dimensional profile samples stored in the sample data base in the selection part 14.

A data table as shown in FIG. 4 is entered from the determination part 12 into the selection part 14 as described above and, in the selection part 14, an event of undefined attributes in the data table is selected by using the random number generated by the random number generator 15 and the data table as shown in FIG. 5 is generated.

In the embodiment shown in FIG. 7, the sample data base stored in the third memory 19 is referred in the selection part 14 after the data table as shown in FIG. 5 has been generated, and a three-dimensional sample conforming to a building for which a three-dimensional model is to be generated is extracted from a number of three-dimensional profile samples registered in the sample data base according to the algorithm shown in FIG. 10.

In step i, one sample of the sample data base is designated.

In step j, the designated sample is referred and whether or not the type of the sample building (in a case of a sample building shown in FIG. 8, type of building=building) coincides with a type of building (in a case of a building shown in FIG. 5, type of building=house) for which a three-dimensional model is to be generated is determined. If the types of buildings differ, the operation returns to the step i and the following sample in the sample data base is designated.

When th types of buildings coincide in step j, the height data are compared and whether or not the difference of these height data is smaller than a certain predetermined value TA is determined. If the sample referred is the three-dimensional profile sample in which repetition of repetitive portions thereof is omitted, the number of repeating steps is calculated in accordance with the number of stories and the height from the ground level of the building for which a three-dimensional model is to be generated and the height data for repeating the steps as many times as the number of steps calculated is used.

After this, in step 1, whether or not the plane profiles are similar is determined.

Figure 11:
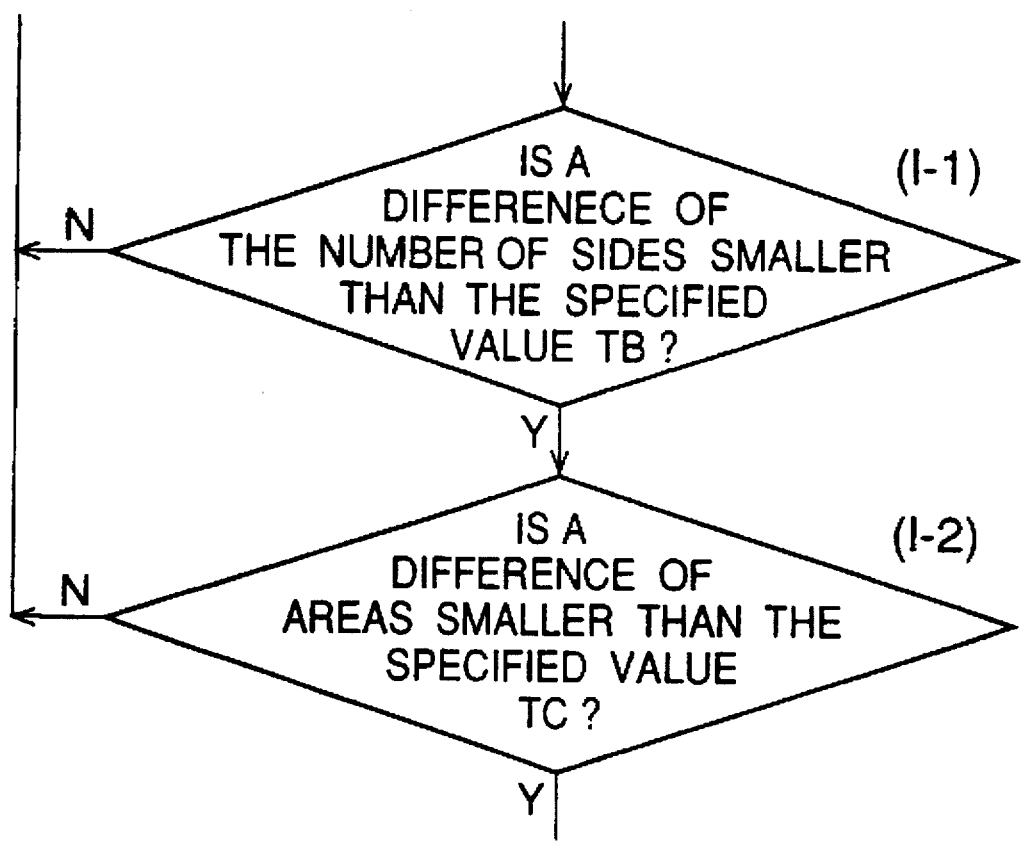

FIG. 11 is a detailed illustration of step 1 shown in FIG. 10.

For determining whether or not the profile samples are similar, determination as to whether or not a difference of the numbers of sides of plane profiles is smaller than a certain predetermined value TB (step 1-1) and determination as to whether or not a difference of areas of plane profiles is smaller than a certain predetermined value TC (step 1-2) are used.

Determination described in steps j to l are conducted with respect to the samples registered in the sample data base and a conforming sample is extracted.

In step m shown in FIG. 10, whether or not the conforming sample has been found is determined and, if the conforming sample has not been found, threshold values TA, TB and TC which are the reference values for determination of the conforming sample are relieved and the operation is returned to the step i and the retrieval is carried out again.

On the other hand, when it is determined in the step m that the conforming sample has been found, the operation advances to step o and whether or not a plurality of candidates (samples) have been found is determined. If there are a plurality of candidates, one of a plurality of candidates is selected in step p according to the uniformly random numbers by using the random number generator 15.

After the conforming sample has been selected from the sample data base as described above, the selection part 14 sends a data table in which the events of undefined attributes as shown in FIG. 5 are defined and the sample extracted as described above to the adjustment part 20. The adjustment part 20 adjusts the sample sent from the selection part 14 to more conform to the model to be generated.

Figure 12:
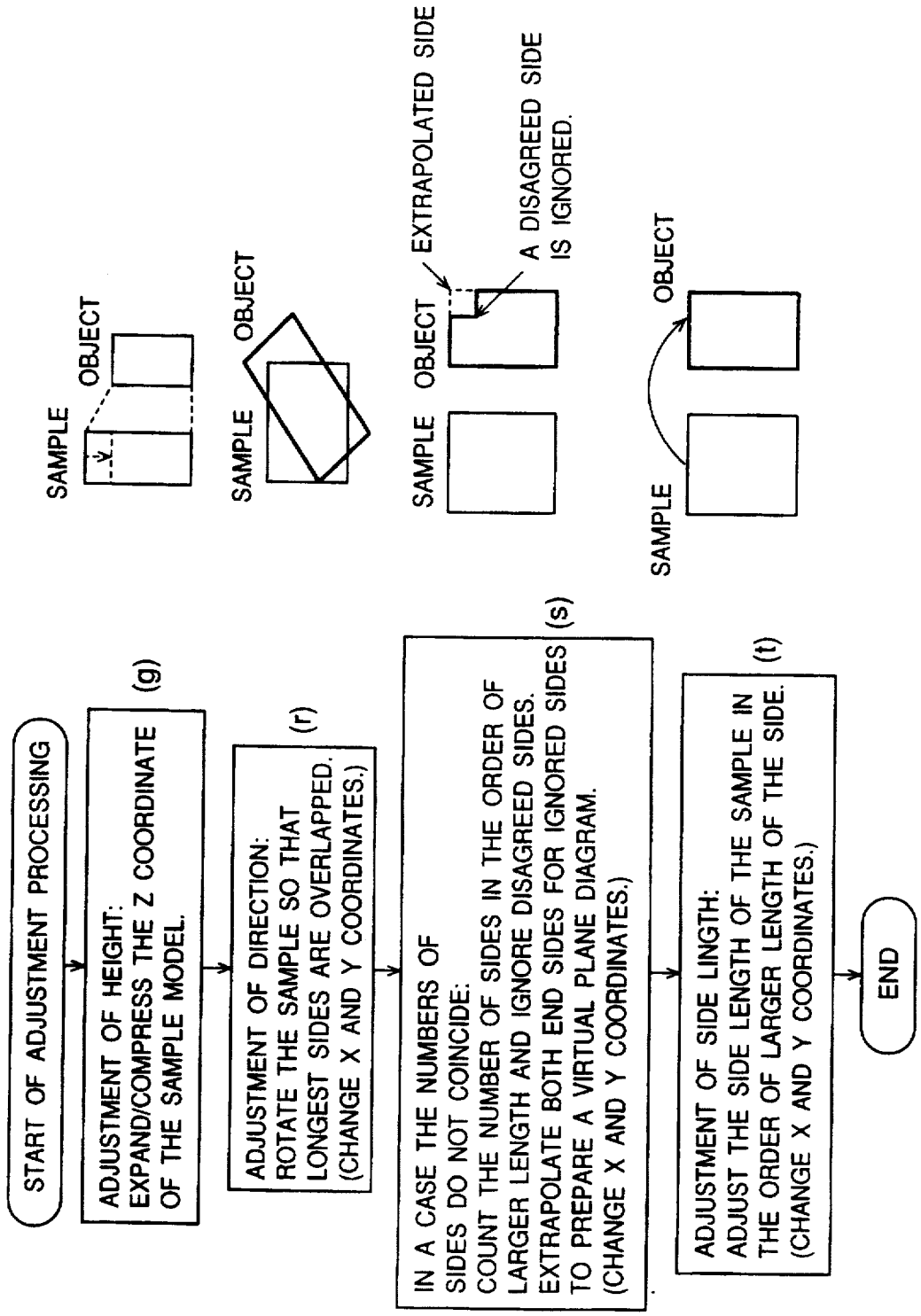
FIG. 12 is a flow chart representing the algorithm for adjustment, and an illustration for ease of understanding.

FIG. 12 shows the flow chart presenting the algorithm for adjustment and an illustration for ease of understanding.

First, in step q, the Z coordinate (the coordinate in the direction of height) is extended or contracted so that the height of the sample selected as described above conforms to the height of the model (hereafter referred to as "object") to be generated.

In step r, a sample which is adjusted in height is rotated (X and Y coordinates are changed) around the Z direction (height direction) as a pivot.

In step r, a sample which is adjusted in height is rotated (X and Y coordinates are changed) around the Z direction (height direction) as a pivot.

In the next step s, whether or not the numbers of sides of the sample and the object on the XY plane coincide is determined and, when these numbers of sides do not coincide, the number of sides is counted in the order of longer sides and the sides which do not coincide are ignored. Those sides which are lost due to ignorance are shorter sides and therefore a virtual plane profile is formed by extrapolating the sides at both ends (X and Y coordinates are changed).

Further in step t, the lengths of sides of the sample are adjusted in the order of longer sides to conform the sides of the sample to the object (X and Y coordinates are changed). To comply with this, the size of image data for a surface pattern (data 1 in the table shown in FIG. 7) defined with respect to respective surfaces of the sample is also adjusted by expansion/compression.

Thus, the height and the side length of the sample extracted from the sample data base are adjusted to conform to the object and a three-dimensional profile model of the object is generated.

The three-dimensional profile model generated as described above is sent to the writing part 16 and stored in the second memory 17 as in the first embodiment shown in FIG. 1, and a three-dimensional profile data base is formed in the second memory 17. This three-dimensional profile data base is sent to the display 18 and an urban three-dimensional model based on the three-dimensional profile data base is drawn on the display screen, not shown, of the display 18. In this embodiment, combination of the determination part 12, the selection part 14, the random number generator 15 and the adjustment part 20 is deemed as an example of three-dimensional profile generating means according to the present invention.

Figure 13:
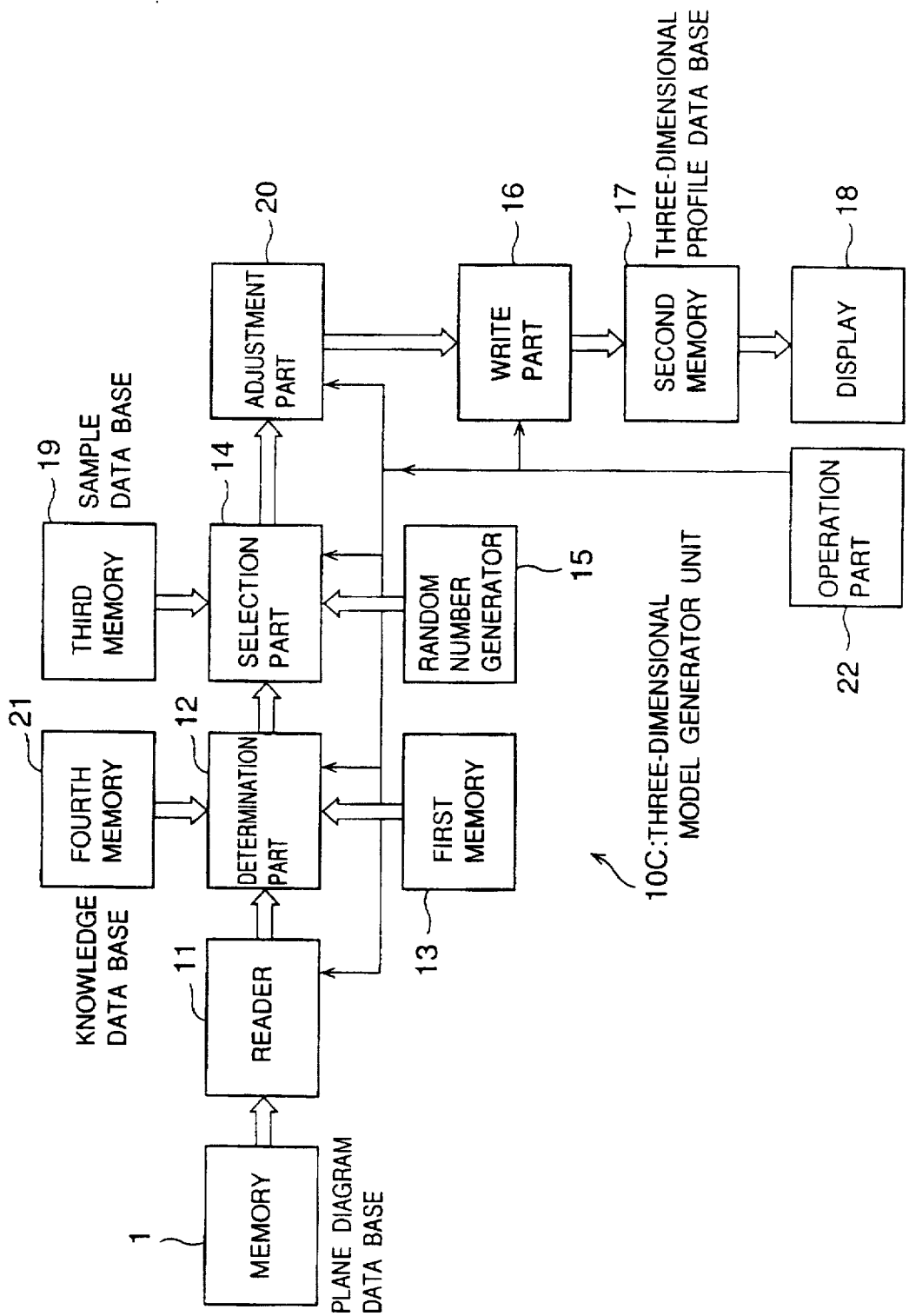
FIG. 13 is a block diagram of the third embodiment of the three-dimensional profile generating apparatus according to the present invention.

FIG. 13 is a block diagram of a third embodiment of the three-dimensional profile generating apparatus according to the present invention. Those blocks corresponding to the blocks of the embodiments shown in FIGS. 1 and 7 are indicated with the same reference numerals as in FIGS. 1 and 7 and only different points are described.

In the third embodiment shown in FIG. 13, a fourth memory 21 which stores the knowledge data base and the operation part 22 for giving various interactive instructions to this three-dimensional model generating apparatus 10C are provided.

Figure 14:
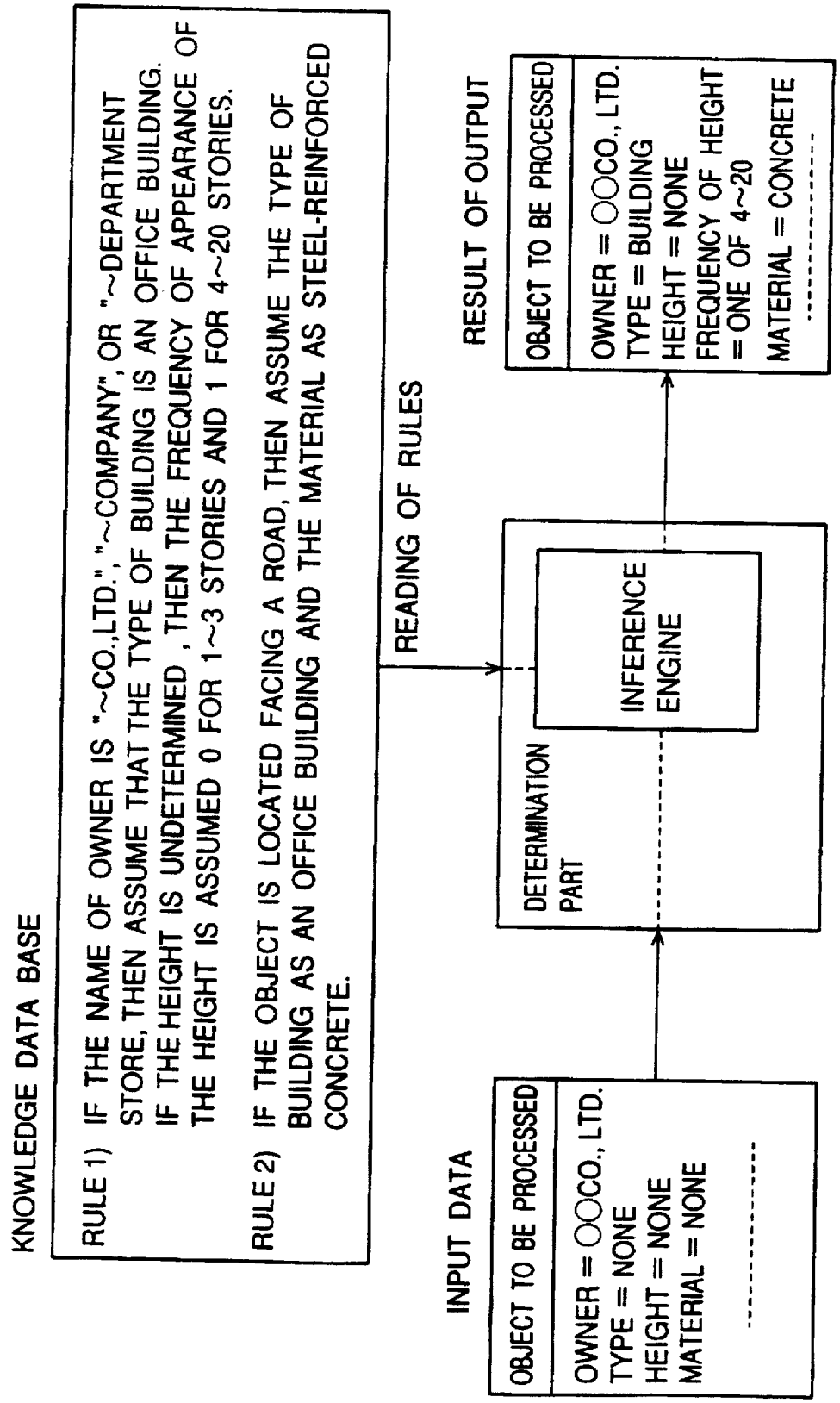
FIG. 14 is a diagram showing an example of the knowledge data base.

FIG. 14 shows an example of the knowledge data base stored in the fourth memory 21.

It is assumed that "owner=OO company" is recorded in the input data (plane diagram data) entered from the reading part 11 into the determination part 12 as shown in FIG. 14 and the type, height and material of the building are not designated.

In this case, in the inference engine in the demermination part 12, the knowledge data base stored in the fourth memory 21 is read out and an event for inferable attributes is designated.

In the example shown in FIG. 14, it is specified in the knowledge data base to make it rule to infer a building as "building" in the case that the name of owner is "~company" and determine the frequency of appearance of the height as "0" for 1 to 3 stories and "1" for 4 to 20 stories in the case that the height of the building is undefined. In the example shown in FIG. 14, another rule is specified that, in a case that the object is located facing the road, the type of the building shall be "building" and the material shall be "steel-reinforced concrete". According to these rules, the determination part infers the type of building as "building", the frequency of appearance of the height as "1" for 4 to 20 stories (the same frequency of appearance in any of storey) and the material "concrete". For the attributes which cannot be primarily determined through this inference (for example, the height of building in FIG. 14), one event is determined according to the random number as described above.

Thus a more realistic three-dimensional urban model is generated by incorporating general knowledge in the knowledge data base.

In the third embodiment shown in FIG. 13, the operation part 22 such as a keyboard or the like is provided and the three-dimensional model is generated in an interactive mode in which the operator gives an instruction for reading the next plane diagram data from the plane diagram data base to the reading part 11, the plane diagram data is read out by the reading part 11 and displayed on the display 18, and the operator gives the following instruction according to the displayed data. In the embodiments according to the present invention, the interactive mode is not limited to a special mode and is available in diversified conventional known modes.

As described above, an three-dimensional urban model on which the intention of the operator is reflected in detail is generated by proceeding generation of the three-dimensional urban model in the interactive mode.

What is claimed is:

1. A three-dimensional model generating method for generating a three-dimensional model, corresponding to plane diagram comprising the steps of:

preparing in advance
   a plane diagram data base which includes plane profile data corresponding to plane profiles of diagrams, and plane diagram data corresponding to sky views of the diagrams, wherein each plane diagram data includes an attribute which is defined with data or is undefined, for generating a corresponding three-dimensional models, and
   a parameter data base to store expected frequencies of appearance of the attributes;
   reading the plane diagram data from the plane diagram data base;
   generating data to define each of the undefined attributes in accordance with the expected frequency of appearance stored in the parameter data base; and
   adding the generated data to the plane diagram data read from the plane diagram data base.

2. A three-dimensional model generating apparatus, comprising;

reading means for reading plane diagram data from a plane diagram data base, which includes
   plane profile information for presenting plane profiles of diagrams and
   plane diagram data which includes an attribute which is defined with data or is undefined, for generating a three-dimensional model of the diagrams;
   a first memory for storing the parameter data base and expected frequencies of appearance of the attributes;
   three-dimensional profile generating means for selecting undefined attributes from said reading means, generating data to define the undefined attributes in accordance with the expected frequencies of appearance, while referring to said parameter data base, and adding the generated data to the selected attributes to thereby define the selected attributes, and for generating three-dimensional profile information based on the defined attributes;
   a second memory for storing the three-dimensional profile information with respect to the corresponding plurality of diagrams; and
   writing means for writing the three-dimensional profile information generated by said three-dimensional profile generating means in said second memory.

3. A three-dimensional model generating apparatus according to claim 2, wherein,
   during generation of the data to define the undefined attributes, said three-dimensional profile generating means generates the data from random numbers having a lower frequency of appearance than the expected frequency of appearance.

4. A three-dimensional model generating apparatus according to claim 2, wherein said three-dimensional model generating apparatus includes a third memory which stores a sample data base defining a plurality of three-dimensional profile samples including a plurality of sample defined attributes; and said three-dimensional profile generating means generates data to define the undefined attributes while referring to said parameter data base and said three-dimensional profile samples.

5. A three-dimensional model generating apparatus according to claim 4, wherein the sample data base omits repetitive portions of the three-dimensional profile samples; and said three-dimensional profile generating means generates the three-dimensional profile samples through repetition of the repetitive portions of the three-dimensional profile samples.

6. A three-dimensional model generating apparatus according to claim 4, wherein, said three-dimensional profile generating means sets a level of conformability which denotes an extent of conformity of the plane diagram information retrieves three-dimensional profile samples which satisfy the level of conformability, and selects the three-dimensional profile samples by resetting the level of conformability.

7. A three-dimensional model generating apparatus according to claim 2, further comprising:

a fourth memory for storing a knowledge data base for inferring the undefined attributes based on the plane diagram information wherein, said three-dimensional profile generating means selects the inferred attribute by referring to said knowledge data base.

* * * * *

UNITED STATES PATENT AND TRADEMARK OFFICE
CERTIFICATE OF CORRECTION

PATENT NO. : 5,727,138                    Page 1 of 2
DATED      : March 10, 1998
INVENTOR(S): Harada It is certified that error appears in the above-identified patent and that said Letters Patent is hereby corrected as shown below:

Col. 1,   line 16, "An" should be --In--;

line 29, after "spectacle" insert --delineation--;

line 41, "image" should be --Image--.

Col. 2,   line 16, "produce" should be --produced--.

Col. 6,   line 49, after "in" insert --the--;

line 65, delete "is".

Col. 7,   line 9, "value area" should be --"range of attributes"--;

line 10, "value (attribute)" should be --values (attributes)--;

line 13, "though" should be --for--;

lines 14 and 15, "value area" should be --range of attributes"--;

UNITED STATES PATENT AND TRADEMARK OFFICE
CERTIFICATE OF CORRECTION

PATENT NO. : 5,727,138

DATED : March 10, 1998

INVENTOR(S) : Harada

It is certified that error appears in the above-identified patent and that said Letters Patent is hereby corrected as shown below:

Col. 8, line 7 (equation (1), "F(j<P*j)*i" should be --F(j)<P(j)*i--;

line 24, "F(j" should be --F(j)--;

line 26, "ms" should be --is--;

line 27, "determined in" should be --determined. In--;

line 34, "reference" should be --referenced--;

line 42, after "as" insert --jj--.

Signed and Sealed this

Twenty-ninth Day of December, 1998

Attest:

BRUCE LEHMAN

Attesting Officer      Commissioner of Patents and Trademarks